(12) United States Patent
Hase

(10) Patent No.: US 8,358,477 B2
(45) Date of Patent: Jan. 22, 2013

(54) BARREL UNIT AND IMAGE PICKUP APPARATUS

(75) Inventor: Hiroyuki Hase, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 12/957,857

(22) Filed: Dec. 1, 2010

(65) Prior Publication Data

US 2011/0134549 A1 Jun. 9, 2011

(30) Foreign Application Priority Data

Dec. 7, 2009 (JP) .................................. 2009-277314

(51) Int. Cl.
*G02B 7/02* (2006.01)
(52) U.S. Cl. ......... 359/824; 359/822; 359/823; 359/826
(58) Field of Classification Search .................. 359/819, 359/822–824, 826
See application file for complete search history.

(56) References Cited

U.S. PATENT DOCUMENTS 7,061,689 B2 * 6/2006 Ichinose et al. ............... 359/696

FOREIGN PATENT DOCUMENTS

JP 2004-336857 11/2004

* cited by examiner

*Primary Examiner* — Ricky Mack
*Assistant Examiner* — Mahidere Sahle
(74) *Attorney, Agent, or Firm* — Cowan, Liebowitz & Latman, P.C.

(57) ABSTRACT

A barrel unit includes a barrel, a holding member configured to hold an optical element, a cylindrical member configured to support the barrel and the holding member, and a driving unit configured to generate a thrust by electrifying in a magnetic field formed by a magnet and a yoke a coil fixed onto the cylindrical member and to drive the holding member in an optical axis direction of the optical element by using the thrust. The yoke, the magnet, and the coil are located outside of a part of the cylindrical member which supports the barrel.

8 Claims, 10 Drawing Sheets

BARREL UNIT AND IMAGE PICKUP APPARATUS

BACKGROUND OF THE INVENTION

1. Field of the Invention

The present invention relates to a barrel unit and an image pickup apparatus.

2. Description of the Related Art

Japanese Patent Laid-Open No. ("JP") 2004-336857 discloses a driving unit used for a lens barrel unit. This driving unit includes a lens holding frame configured to move in an optical axis direction, a driving coil fixed onto the lens holding frame and having a winding direction perpendicular to the optical axis direction, a plate-shaped driving magnet parallel to the optical axis direction, and a yoke that extends parallel to the optical axis direction and is configured to fix the driving magnet. The lens holding frame is moved in the optical axis direction by a primary guide shaft and a secondary guide shaft.

However, the driving unit disclosed in JP 2004-336857 has a room of miniaturization.

SUMMARY OF THE INVENTION

A barrel unit according to one aspect of the present invention includes a barrel, a holding member configured to hold an optical element, a cylindrical member configured to support the barrel and the holding member, and a driving unit configured to generate a thrust by electrifying in a magnetic field formed by a magnet and a yoke a coil fixed onto the cylindrical member and to drive the holding member in an optical axis direction of the optical element by using the thrust. The yoke, the magnet, and the coil are located outside of a part of the cylindrical member which supports the barrel.

Further features of the present invention will become apparent from the following description of exemplary embodiments with reference to the attached drawings.

DESCRIPTION OF THE EMBODIMENTS

Referring now to the accompanying drawings, a description will be given of embodiments of the present invention.

First Embodiment

Figure 1:
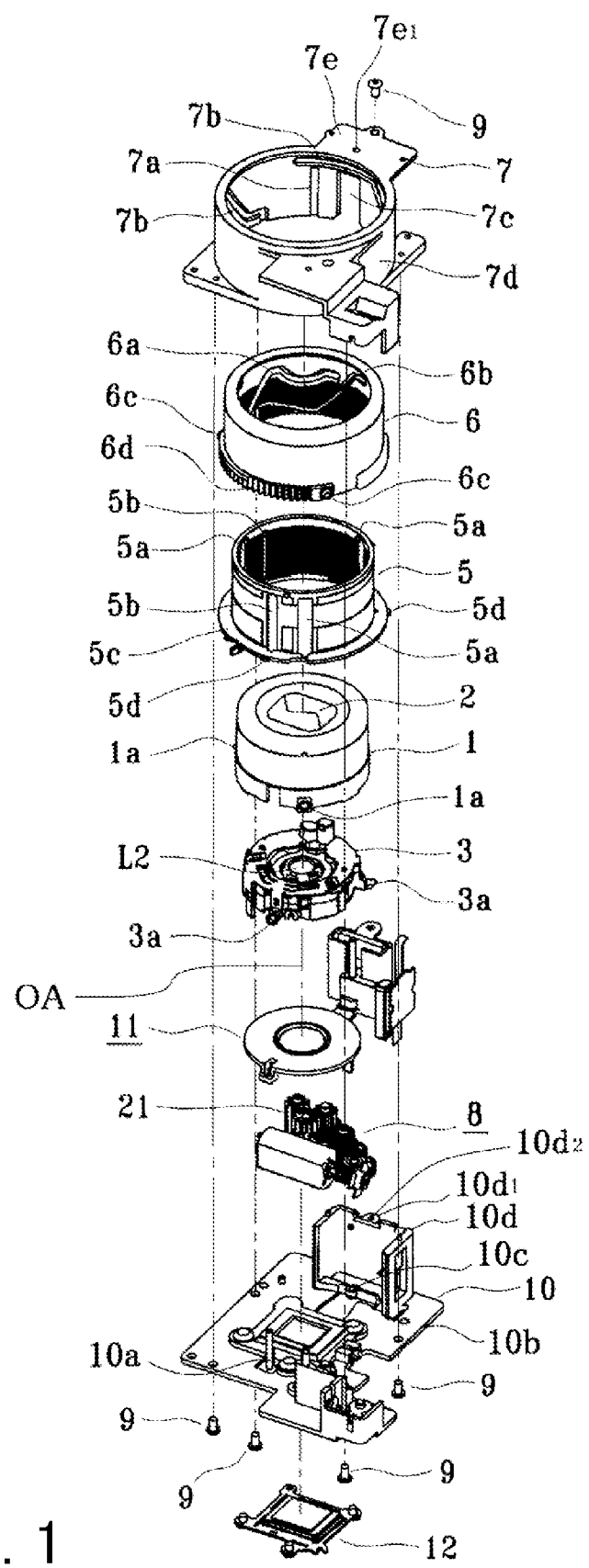
FIG. 1 is an exploded perspective view of a barrel unit according to a first embodiment of the present invention.

FIG. 1 is an exploded perspective view of a barrel unit that can be mounted on a camera (image pickup apparatus). The barrel unit includes a first barrel 1, a second barrel 3, a linear movement cylinder 5, a rotation cylinder 6, a fixture cylinder (cylindrical member) 7, a zoom deceleration mechanism 8, a fixture base plate 10, a focus driving mechanism 11, and a CCD image sensor 12.

The first barrel 1 holds a first lens unit (not illustrated) and a barrier 2, and three cam followers 1a are attached to an outer circumferential surface of the first barrel 1 in the circumferential direction. These three cam followers 1a perforate three linear movement grooves 5a that are formed in the linear movement cylinder 5 and extend in the optical axis direction OA. The three cam followers 1a are engaged with three cam grooves 6a formed in the inner circumferential surface of the rotation cylinder 6.

The second barrel 3 holds a second lens unit L2 and a shutter (not illustrated), and three cam followers 3a are attached to an outer circumferential surface of the second barrel 3 in the circumferential direction. The three cam followers 3a perforate three linear movement grooves 5b of the linear movement cylinder 5 and are engaged with the three cam grooves 6b of the rotation cylinder 6.

The linear movement cylinder 5 restricts rotations of the first barrel 1 and the second barrel 3, and is supported by the inner circumference of the rotation cylinder 6. Three projections 5d are formed on the outer circumferential surface of a flange portion 5c of the linear movement cylinder 5 in the circumferential direction. The three projections 5d are engaged with three linear movement grooves 7a that are formed in an inner circumferential surface of the fixture cylinder 7 and extend in the optical axis direction OA.

The rotation cylinder 6 moves both the first barrel 1 and the second barrel 3 in the optical axis direction OA. Three cam followers 6c and a gear 6d are formed on the outer circumferential surface of the rotation cylinder 6 in the circumferential direction. The three cam followers 6c are engaged with three cam grooves 7b formed on an inner circumferential surface of the fixture cylinder 7, and the gear 6d is engaged with a deceleration gear 21 of the zoom deceleration mechanism 8.

The fixture cylinder 7 movably supports the first barrel 1, the second barrel 3, and the rotation cylinder 6 in the optical axis direction OA, and holds the zoom deceleration mechanism 8. The fixture cylinder 7 is fixed onto the fixture base plate 10 via five screws 9.

The fixture base plate 10 supports the fixture cylinder 7, the zoom deceleration mechanism 8, the focus driving mechanism 11, and the CCD image sensor 12. The fixture base plate 10 includes a rotation restricting shaft 10a and a substrate portion 10b.

The substrate portion 10b has a flat plate shape perpendicular to the optical axis direction OA, and the rotation restriction shaft 10a extends perpendicular to the substrate portion 10b (or parallel to the optical axis direction OA) and is fixed onto the substrate portion 10b. The substrate portion 10b includes a hollow cylinder portion 10c that extends parallel to the optical axis direction OA. The substrate portion 10b further includes a yoke fixture portion 10d used to fix a yoke 28 and arranged outside of the fixture cylinder 7 in the assembly time.

The yoke fixture portion 10d stands parallel to the optical axis direction OA from the substrate portion 10b, and has a U-shaped section and a semicircular projection $10d_1$ on its top surface. The projection $10d_1$ has a perforation hole $10d_2$ formed parallel to the optical axis direction.

Figure 2:
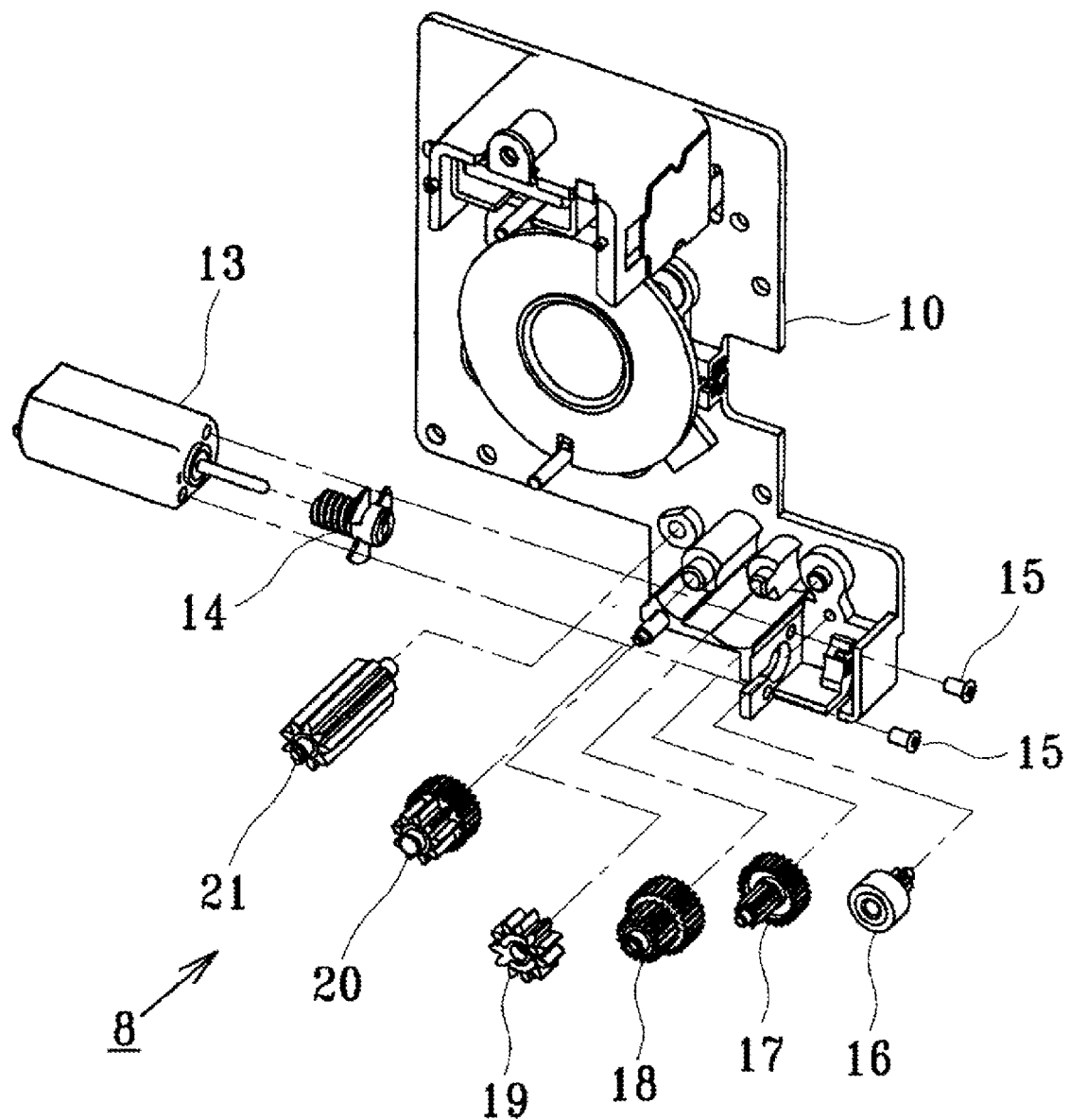
FIG. 2 is an exploded perspective view of a zoom deceleration unit illustrated in FIG. 1.

FIG. 2 is an exploded perspective view of the zoom deceleration mechanism 8. Reference numeral 13 denotes a motor, and a deceleration gear 14 is press-fitted with the tip of the motor 13. The motor 13 is fixed onto the fixture base plate 10 via two screws 15. A deceleration gear 16 to a deceleration gear 21 are rotatably supported on the fixture base plate 10, and held by the fixture cylinder 7. The deceleration gear 21 is engaged with the gear 6d of the rotation cylinder 6.

When a main switch (not illustrated) is turned on, the motor 13 rotates and the driving force of the motor 13 is transmitted to the gear 6d of the rotation cylinder 6 from the deceleration gear 14 to the deceleration gears 16, 17, 18, 19, 20, and 21 in this order. The rotation cylinder 6 to which the driving force is transmitted rotates and moves in the optical axis direction OA while the cam followers 6c rotates along the cam grooves 7b of the fixture cylinder 7. At this time, the linear movement cylinder 5 supported on the inner circumference of the rotation cylinder 6 moves in the optical axis direction OA without rotating because the linear movement cylinder 5 is restricted from rotating due to the engagements between the projections 5d of the linear movement cylinder 5 and the linear movement grooves 7a of the fixture cylinder 7.

When the rotation cylinder 6 rotates, the first barrel 1 moves in the optical axis direction OA along the cam grooves 6a of the rotation cylinder 6. At this time, the first barrel 1 moves in the optical axis direction OA without rotating because the first barrel 1 is restricted from rotating due to the engagements between the cam followers 1a and the linear movement grooves 5a of the linear movement cylinder 5. In addition, the second barrel 3 is moved in the optical axis direction OA along the cam grooves 6b of the rotation cylinder 6. At this time, the second barrel 3 moves in the optical axis direction OA without rotating because the second barrel 3 is restricted from rotating due to the engagements between the cam followers 3a of the second barrel 3 and the linear movement grooves 5b of the linear movement cylinder 5.

The focus driving mechanism 11 serves as a driving unit configured to drive in the optical axis direction OA a lens holding frame 22 configured to hold a third lens unit L3 as an optical element as an object to be driven. This driving unit can broadly apply a driving unit that is configured to generate a thrust in a coil and to drive a holding member configured to hold the coil and the member to be driven through the thrust by electrifying the coil that is arranged between a yoke and a magnet.

Figure 3:
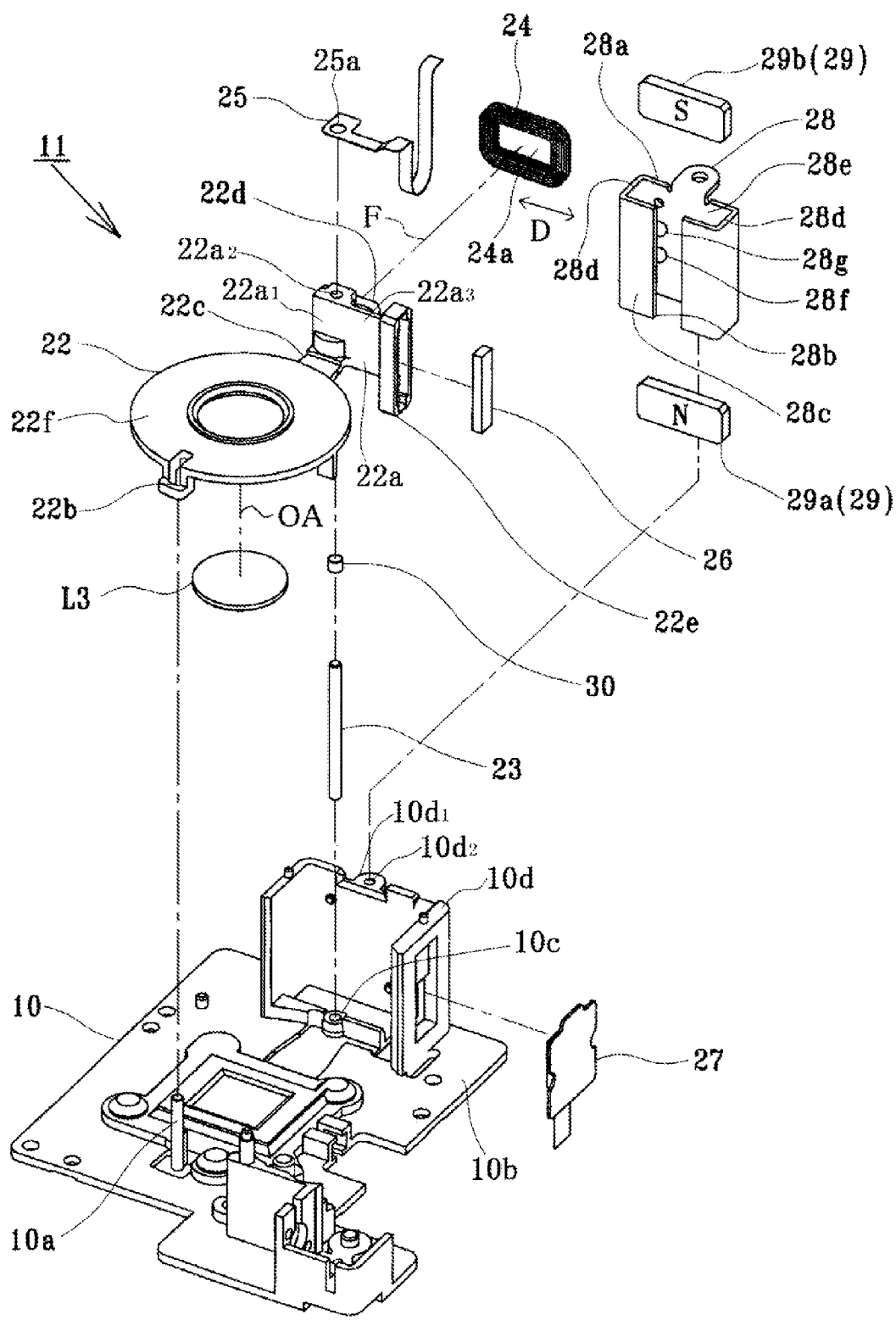
FIG. 3 is an exploded perspective view of a focus driving mechanism illustrated in FIG. 1.
Figure 4:
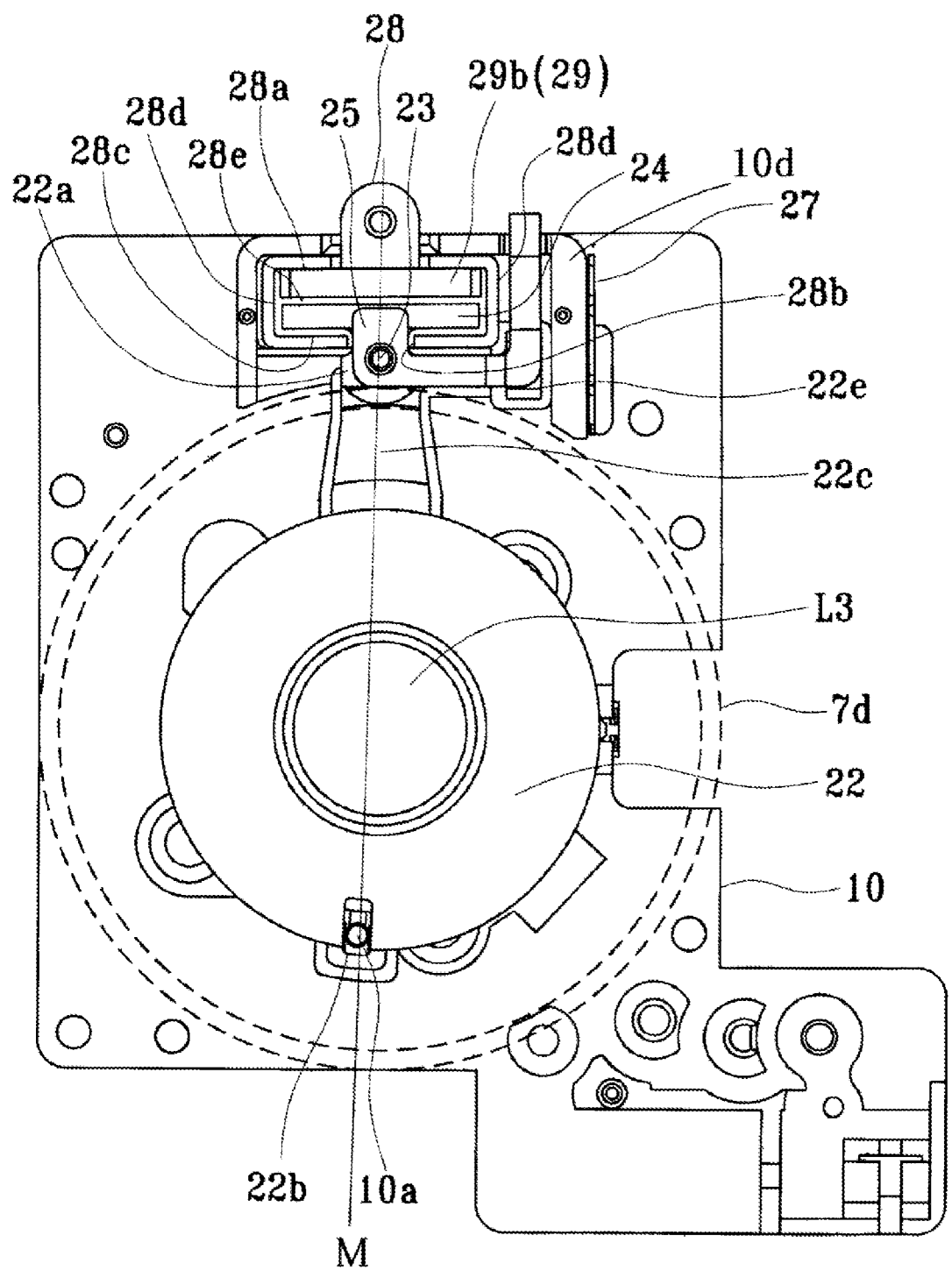
FIG. 4 is a front view illustrating that the focus driving mechanism illustrated in FIG. 3 is incorporated into a fixture base plate.
Figure 5:
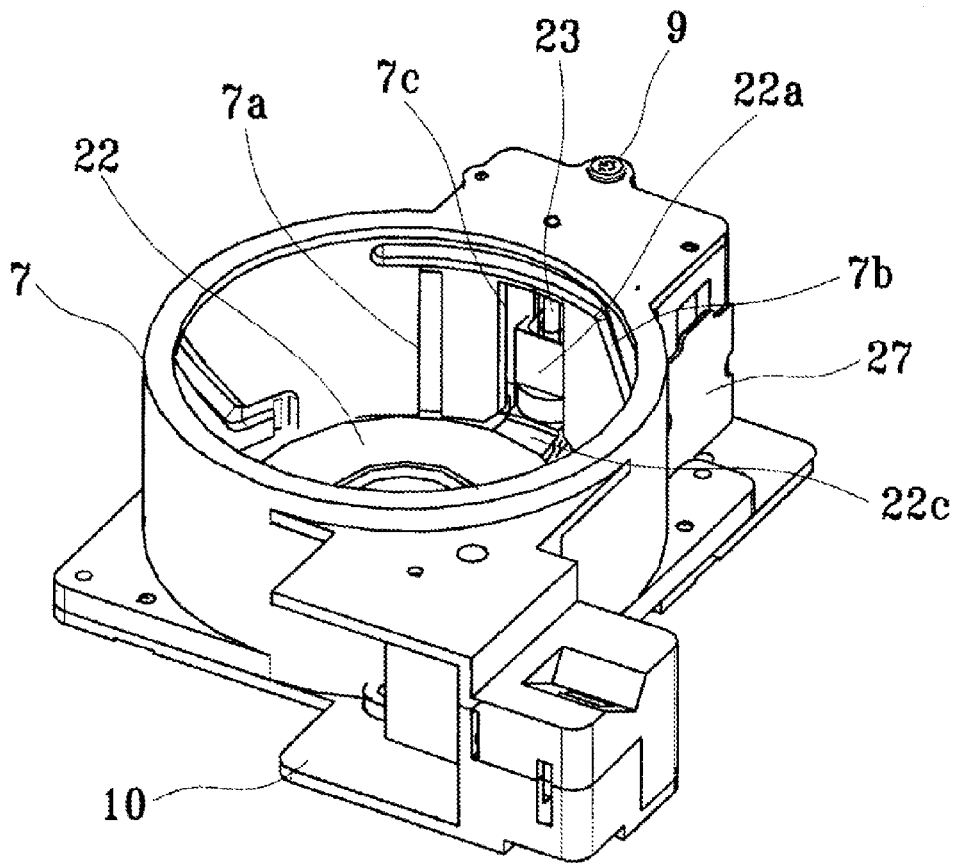
FIG. 5 is a front view illustrating that the focus driving mechanism and the fixture base plate illustrated in FIG. 3 are incorporated into a fixture cylinder illustrated in FIG. 1.

FIG. 3 is an exploded perspective view of the focus driving mechanism 11. FIG. 4 is a front (or plane) view illustrating that the focus driving mechanism 11 is incorporated into the fixture base plate 10. FIG. 5 is a perspective view illustrating that the focus driving mechanism 11 and the fixture base plate 10 are incorporated into the fixture cylinder 7.

Figure 6:
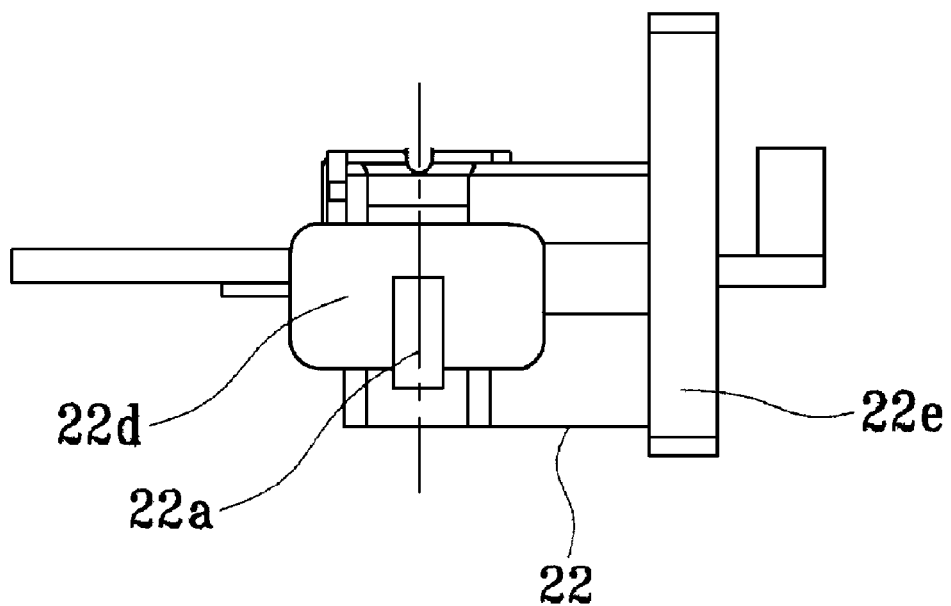
FIG. 6 is a side view of the lens holding frame illustrated in FIG. 3.
Figure 7:
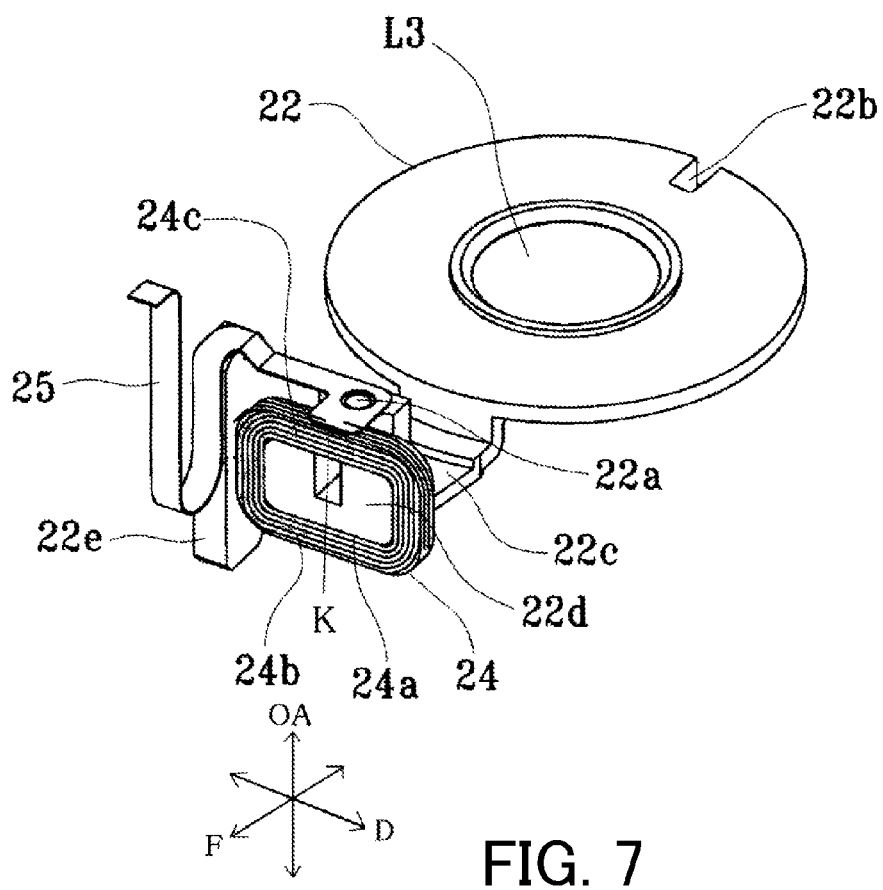
FIG. 7 is a perspective view of the lens holding frame illustrated in FIG. 3.
Figure 8:
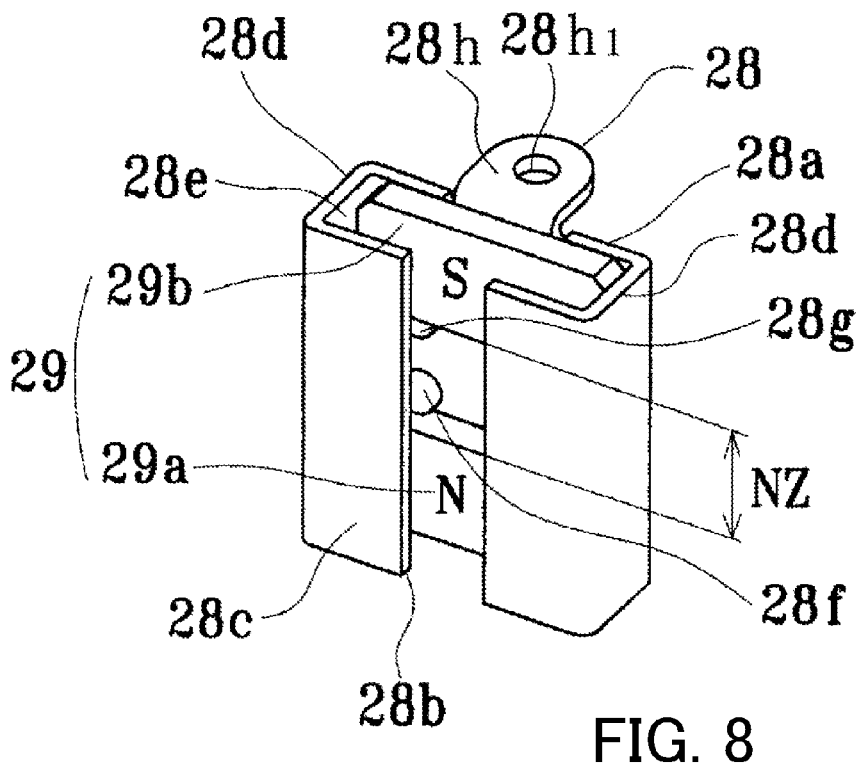
FIG. 8 is a perspective view of a yoke incorporated with a magnet illustrated in FIG. 3.

FIG. 6 is a side view illustrating a relationship between a sleeve portion 22a and a fixture portion 22d of the lens holding frame 22. FIG. 7 is a perspective view of the lens holding frame 22 into which the coil 24 is incorporated. FIG. 8 is a perspective view of the yoke 28 into which the magnet 29 is incorporated.

The lens holding frame 22 includes a sleeve portion 22a, an arm portion 22c, and a body 22f. The lens holding frame 22 is a holding member configured to move parallel to the optical axis direction OA. The body 22f holds the third lens unit L3 as an object to be driven.

The body 22f has a rotation restricting portion 22b that forms a perforation hole at the outer circumferential edge. The rotation restriction portion 22b is perforated by the rotation restricting shaft 10a arranged in a cylindrical portion 7d (illustrated by a broken line) of the fixture cylinder (cylindrical member) 7, as illustrated in FIG. 4. Since the rotation restricting shaft 10a is fixed onto the substrate portion 10b, the body 22f can be guided by the rotation restricting shaft 10a without rotating and can be moved parallel to the optical axis direction OA.

The plate-shaped arm portion 22c is fixed onto an outer circumferential position of the body 22f opposite to the rotation restricting portion 22b with respect to the center of the third lens unit L3, and extends in a (radial) direction orthogonal to the optical axis direction OA. The arm portion 22c passes a notch portion 7c formed in a space between the linear movement groove 7a and the cam groove 7b of the fixture cylinder 7, as illustrated in FIGS. 1 and 5. In addition, the arm portion 22c has such a length that the guide shaft 23 and the coil 24 can be located outside of the fixture cylinder 7. Thereby, the barrel unit can be made small.

The sleeve portion 22a stands parallel to the optical axis direction OA from the arm portion 22c, and is located outside of the cylindrical portion 7d (illustrated by the broken line) of the fixture cylinder 7, as illustrated by FIG. 4. The sleeve portion 22a includes an approximately rectangular parallelepiped body $22a_1$, and a bottom of an inner side surface $22a_3$ of the body $22a_1$ is connected to the arm portion 22c.

The sleeve portion 22a includes a perforation hole $22a_2$ that perforates top and bottom surfaces of the body $22a_1$, an approximately rectangular parallelepiped fixture portion 22d that projects to the outside from an outer side surface opposite to the inner side surface $22a_3$, and a holder 22e formed on a side surface that is perpendicular to the top and bottom surfaces, the inner side surface, and the outer side surface of the body $22a_1$.

A guide shaft 23 is inserted into the perforation hole $22a_2$. One end of the guide shaft 23 contacts a bottom surface of a projection 7e of the fixture cylinder 7 and fixed onto the projection 7e via a screw (not illustrated) and screw holes $7e_1$. The other end of the guide shaft 23 is inserted into a hollow portion of the hollow cylinder portion 10c of the fixture base plate 10. After the guide shaft 23 is inserted into the perforation hole $22a_2$ via a spring 30, the guide shaft 23 contacts the bottom surface of the projection 7e via a perforation hole 25a of a flexible substrate 25. In addition, the guide shaft 23 is arranged in an opening 28b of the yoke 28, as illustrated in FIG. 4.

The guide shaft 23 is supported parallel to the optical axis direction OA between the fixture cylinder 7 and the fixture base plate 10, and thus the sleeve portion 22a can be moved parallel to the optical axis direction OA while guided by the guide shaft 23.

The fixture portion 22d is arranged in a bilateral symmetry with respect to the body $22a_1$ of the sleeve portion 22a, as illustrated in FIG. 6. The fixture portion 22d is inserted into an air core portion 24a of the coil 24 at a position opposite to the rotation restricting portion 22b with respect to the center of the third lens unit L3, as illustrated in FIG. 7. As illustrated in FIG. 4, the fixture portion 22d is arranged in a housing space 28e of the yoke 28.

The holder 22e fixes the encoder magnet 26.

The coil 24 includes a first driving force generator 24b and a second driving force generator 24c each configured to generate a driving force. The coil 24 is held and fixed by the sleeve portion 22a of the lens holding frame 22 as a result of that the fixture portion 22d of the lens holding frame 22 is inserted into the air core portion 24a that extends in the (center axis) direction (F) orthogonal to the optical axis direction OA, as illustrated in FIG. 7. Therefore, the coil 24 moves parallel to the optical axis direction OA together with the lens holding frame 22 while the coil 24 is fixed onto the lens holding frame 22.

The coil 24 is wound around its center axis direction F. More specifically, the coil 24 includes a pair of winding portions parallel to the optical axis direction OA, and a pair of winding portion parallel to a (driving current flowing) direction D perpendicular to both the center axis direction F and the optical axis direction OA. As illustrated in FIG. 7, the first driving force generator 24b and the second driving force generator 24c of the coil 24 are winding portions parallel to the direction D, and the first driving force generator 24b is located under the second driving force generator 24c (or on the image pickup surface side).

In this embodiment, the driving unit includes the guide shaft 23 engaged with the lens holding frame 22 and configured to guide a movement of the lens holding frame 22. The lens holding frame 22 includes the sleeve portion 22a, and the sleeve portion 22a includes the perforation hole 22a$_2$ (engagement portion) engaged with the guide shaft 23, and the fixture portion 22d inserted into the air core portion 24a of the coil 24 and configured to fix the coil 24.

Since JP 2004-336857 arranges a guide member of a primary guide shaft and a driving coil distant from each other, an operational failure of the lens holding frame may occur due to pinching of the guide member as the guide member, into which the primary guide shaft is inserted, becomes shorter in the optical axis direction.

On the other hand, since this embodiment holds the guide shaft 23 and the coil 24 on the sleeve portion 22a, the coil 24 is close to the guide shaft 23. As a result, even when an engagement length (which is a length of the perforation hole 22a$_2$) parallel to the optical axis direction OA between the guide shaft 23 and the sleeve portion 22a becomes shorter, the operational failure of the lens holding frame 22 is less likely to occur.

This effect is enhanced by symmetrically arranging the coil 24 with respect to the plane that passes the center axis of the guide axis 23 and the center axis of the air coil portion 24a of the coil 24. This is because no force is applied to the guide shaft 23 in a direction that inclines to the center axis of the guide shaft 23, when the coil 24 moves. This plane is a plane that passes a line M and is perpendicular to the paper plane of FIG. 4, or a plane perpendicular to the paper plane of FIG. 6 and passes an alternate long and short dash line.

In addition, the top and bottom surfaces of the body 22a$_1$ having the perforation hole 22a$_2$ are adjacent and orthogonal to the outer side surface on which the fixture portion 22d is provided. Since JP 2004-336857 arranges the center axis of the air core portion of the coil parallel to the optical axis direction, the driving unit becomes large due to the space of the coil. On the other hand, this embodiment miniaturizes the barrel unit by arranging the center axis of the air core portion of the coil 24 perpendicular to the optical axis direction.

In addition, according to this embodiment, the sleeve portion 22a is engaged with the guide shaft 23 and holds the coil 24, and the center axis of the rotation restricting shaft 10a, the optical axis, and the center axis of the guide shaft 23 are approximately arranged on the same line M. The coil 24 includes the winding portions (driving force generators 24b and 24c) in which the current flows in the direction perpendicular to both the optical axis direction OA and the center axis direction F. Moreover, an axis K illustrated in FIG. 7 corresponds to an alternate long and short dash line in FIG. 6, is parallel to the optical axis direction OA, and halves a length of these winding portions in the direction D. The axis K is located on the plane that is perpendicular to the paper plane of FIG. 4 and passes the line M or the plane that is perpendicular to the paper plane of FIG. 6 and passes the alternate long and short dash line. Therefore, this embodiment can reduce driving noises, because the engagement states the guide shaft 23 and the rotation restricting shaft 10a little change, even when the coil 24 is electrified and moved by an attraction force to the magnet 29.

On the other hand, according to JP 2004-336857, the coil is a separate member from the guide member into which the primary guide shaft is inserted, and the coil is arranged at a position that shifts from a line that passes the center axes of the primary guide shaft and the secondary guide shaft (see FIG. 3 of JP 2004-336857). Therefore, according to FIG. 3 of JP 2004-336857, as the coil longitudinally displaces, for example, an engagement state varies between the secondary guide shaft and an engagement notch into which the secondary guide shaft is inserted and the driving noises occur due to the loose engagement.

The coil 24 is arranged apart from the magnet 29 by a predetermined distance in the housing space 28e of the yoke 28, as illustrated in FIG. 4.

The flexible substrate 25 is fixed onto the lens holding frame 22, and electrically connected to the coil 24 as illustrated in FIG. 7.

The encoder magnet 26 extends parallel to the optical axis direction OA, is fixed into the holder 22e of the lens holding frame 22, and moves parallel to the optical axis direction OA together with the lens holding frame 22. An MR sensor 27 as a magnetic sensor is fixed onto the fixture base plate 10, and arranged opposite to the encoder magnet 26.

When the encoder magnet 26 moves together with the lens holding frame 22 relative to the MR sensor 27, the magnetism affecting the MR sensor 27 varies and the output from the MR sensor 27 changes. Based on this output change, a CPU (not illustrated) can detect a position of the lens holding frame 22 in the optical axis direction OA. The CPU controls a current that is supplied to the coil 24 via the flexible substrate 25 by referring to positional information of the lens holding frame 22 detected through the MR sensor 27, and thereby the CPU moves the third lens unit L3 to a target position.

The yoke 28 has a rectangular pole shape that extends parallel to the optical axis direction OA, is housed in a yoke fixture portion 10d of the fixture base plate 10, is fixed onto the yoke fixture portion 10d by fastening the screw 9 into the perforation hole 10d$_2$ of the projection 10d$_1$ and a perforation hole 28h$_1$ of a projection 28h.

The yoke 28 includes a fixture yoke 28a onto which the magnets 29 are fixed, a pair of opposite yokes 28c arranged parallel and opposite to the fixture yoke 28a, and a pair of combining portions 28d each configured to combine the fixture yoke 28a and the opposite yoke 28c with each other. An opening 28b is formed at the center of the pair of opposite yokes 28c and extends in the optical axis direction OA. The housing space 28e is an internal space enclosed by the fixture yoke 28a, the opposite yokes 28c, and the combining portions 28d.

Since the fixture yoke 28a and the opposite yokes 28c are integrated, a closed magnetic path can be formed without increasing the number of components. The opposite yokes 28c are located between the guide shaft 23 and the coil 24, as illustrated in FIG. 4.

As illustrated in FIG. 4, the fixture portion 22d that is located inside of the opening 28b, the coil 24, and the magnet 29 are arranged in the housing space 28e of the yoke 28, and the coil 24 is located between the magnet 29 and the opposite yokes 28c. The barrel unit can be made smaller since the fixture portion 22d, the coil 24, and the magnets 29 are located in the housing space 28e.

Each magnet 29 has a plate shape, and a surface parallel to the optical axis direction OA. The magnets 29 include a pair of magnets 29a and 29b, and are magnetized so that the front surface and the back surface can have different polarities. As illustrated in FIG. 8, the magnets 29a and 29b are distant from each other by a predetermined interval (this space between them will be referred to as a "neutral zone NZ"), arranged in the housing space 28e of the yoke 28, and fixed onto the fixture yoke 28a of the yoke 28.

The magnet 29a is located on the imaging plane side (or on the lower side in FIG. 8), and contacts a projection 28f formed on the fixture yoke 28a of the yoke 28. Thereby, the magnet 29a is positioned. The magnet 29b is located on the object side (or on the upper side in FIG. 8), and contacts a projection 28g formed on the fixture yoke 28a of the yoke 28. Thereby, the magnet 29b is positioned.

Figure 9A:
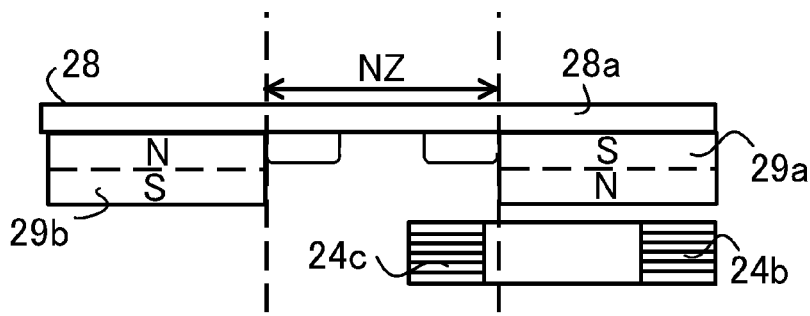
FIGS. 9A to 9E are sectional views illustrating a movement of a coil for a magnet illustrated in FIG. 8.
Figure 9B:
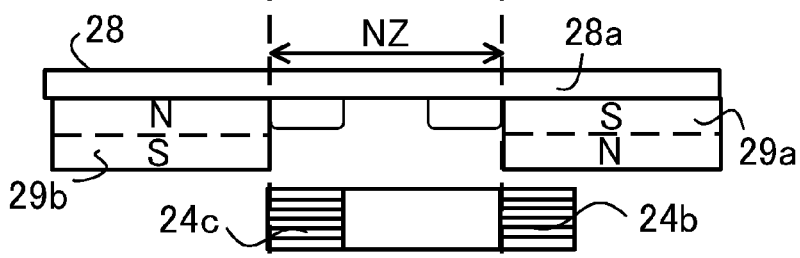
Figure 9C:
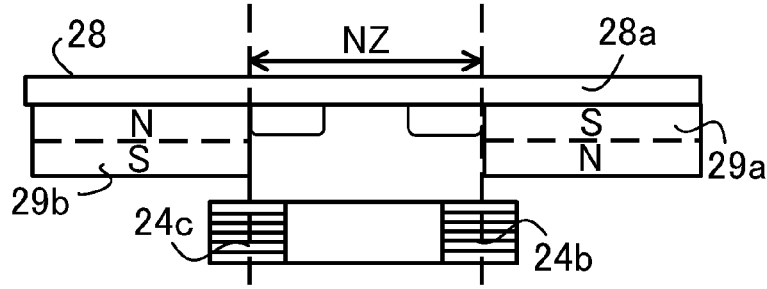
Figure 9D:
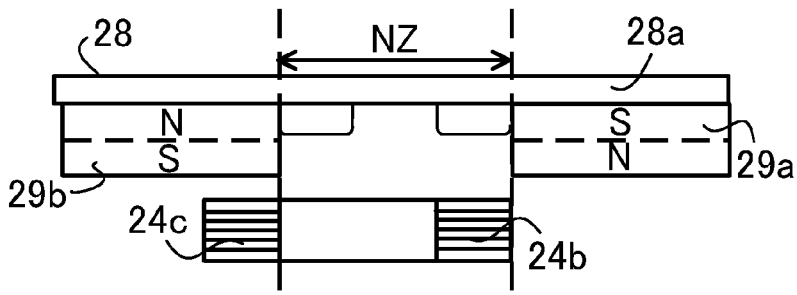
Figure 9E:
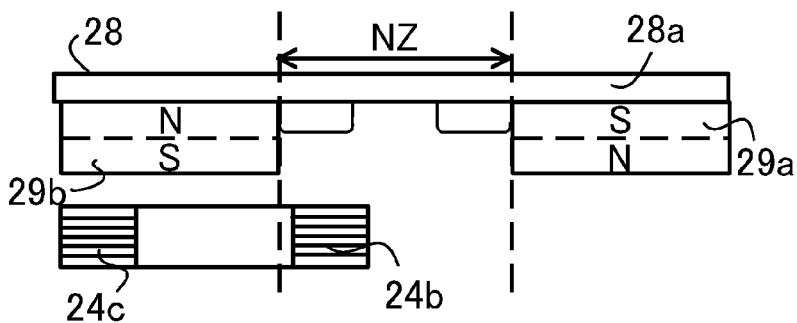

FIGS. 9A to 9E are sectional views illustrating a movement of the coil 24 relative to the magnets 29. In FIG. 9A, illustrates a non-image-pickup state and an image-pickup standby state of the lens holding frame 22, in which the coil 24 is located on the imaging plane side. FIG. 9B illustrates a state just before the driving force generator of the coil 24 is transferred while the lens holding frame 22 is moving. FIG. 9C illustrates a state in which the driving force generator of the coil 24 is transferred while the lens holding frame 22 is moving. FIG. 9D illustrates a state in which the driving force generator of the coil 24 has been transferred while the lens holding frame 22 is moving. FIG. 9E illustrates a maximum feeding state of the lens holding frame 22.

Figure 10:
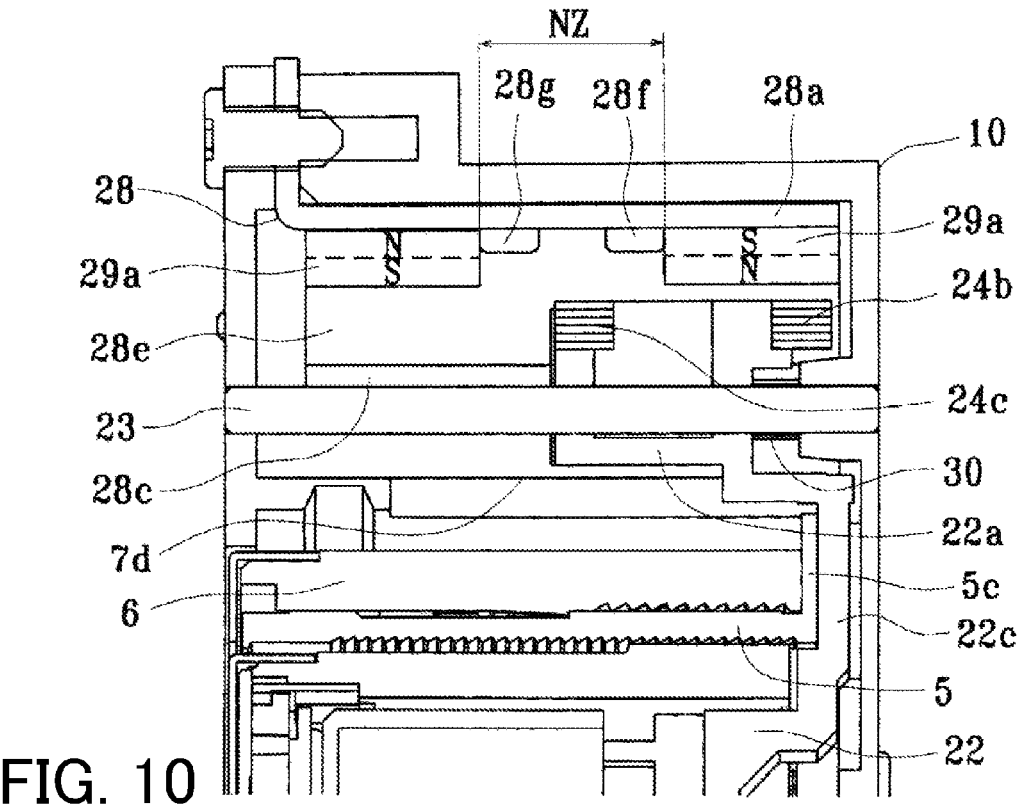
FIG. 10 is a partially sectional view of a barrel unit illustrated in FIG. 1.
Figure 11:
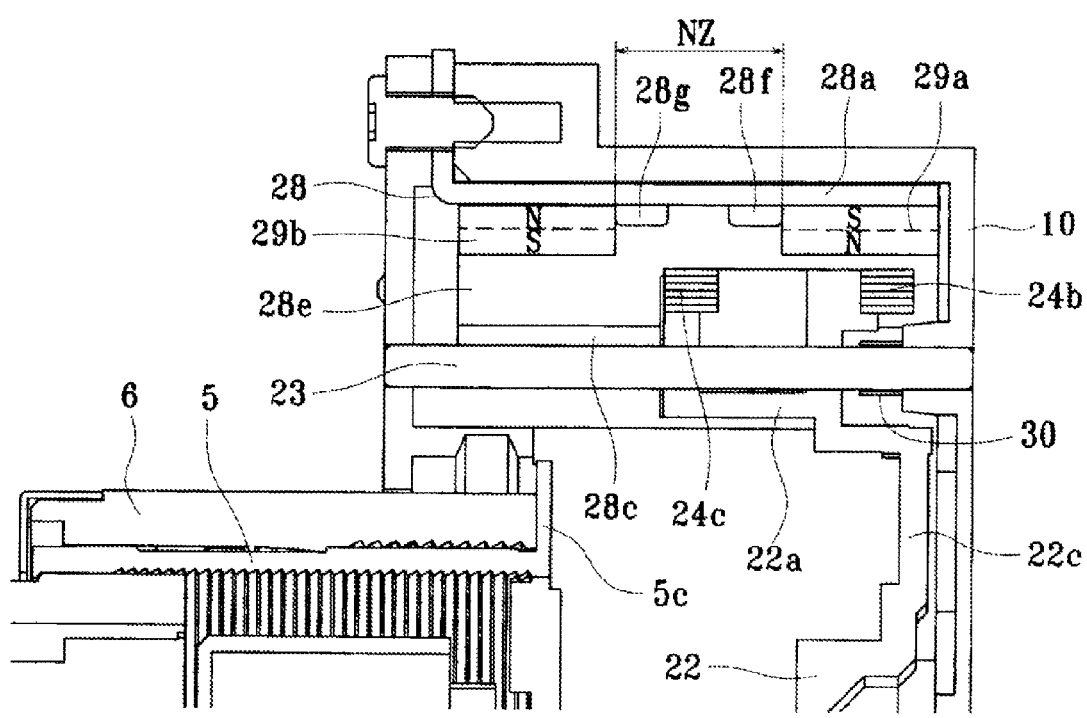
FIG. 11 is a partially sectional view of a barrel unit illustrated in FIG. 1.
Figure 12:
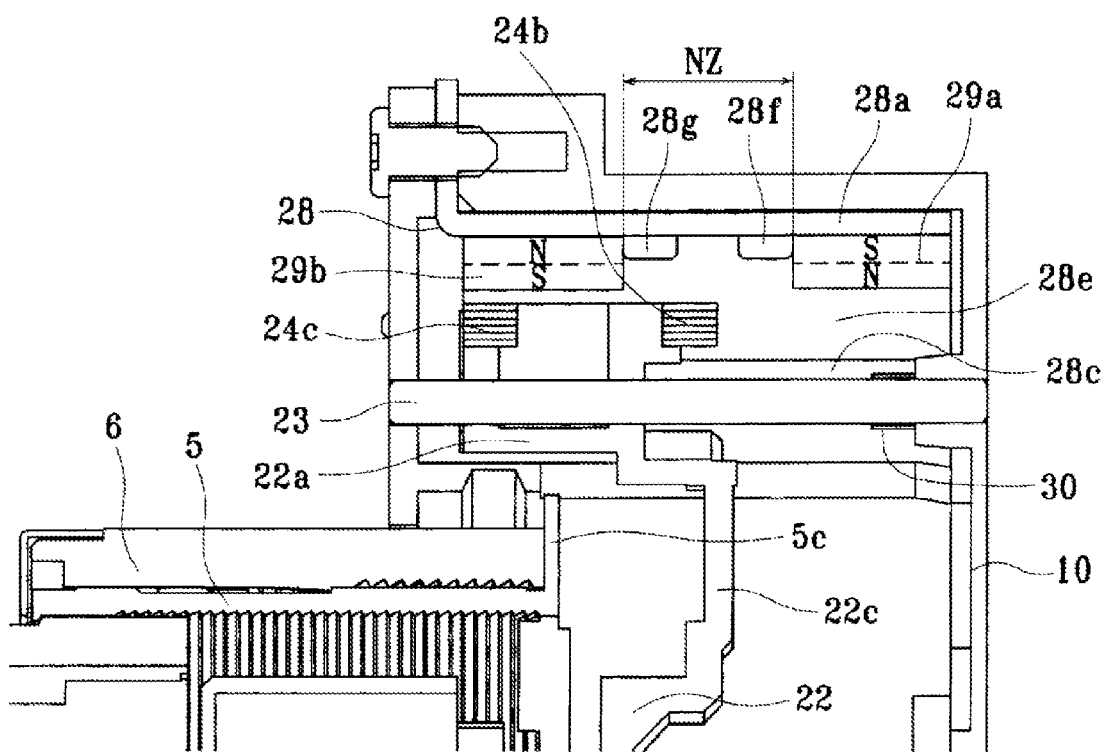
FIG. 12 is a partially sectional view of the barrel unit illustrated in FIG. 1.

FIG. 10 is a partially sectional view of the barrel unit that is located at a non-image-pickup position. FIG. 11 is a partially sectional view of the barrel unit that is located at the image-pickup standby state. FIG. 12 is a sectional view of the barrel unit when the lens holding frame 22 is in the maximum feeding state and in the image pickup state.

The neutral zone NZ is set so that when the coil 24 is located at a position illustrated in FIG. 9A the second driving force generator 24c of the coil 24 does not generate a thrust parallel to the optical axis direction OA. In addition, the neutral zone NZ is set so that when the coil 24 is located at a position illustrated in FIG. 9E, the first driving force generator 24b of the coil 24 does not generate a thrust parallel to the optical axis direction OA.

When the first driving force generator 24b and the second driving force generator 24c are located in the neutral zone NZ, as illustrated in FIG. 9C, the current flows in the first driving force generator 24b and the second driving force generator 24c in opposite directions. Since their magnetic fields are also generated in opposite directions, thrusts are consequently generated in the same direction, which is parallel to the optical axis direction OA.

The spring 30 is a compression spring that applies a biasing force to the lens holding frame 22 in the feeding direction in the non-image-pickup state. The guide shaft 23 is inserted into a hollow portion of the spring 30, and the guide shaft 23 is arranged between the fixture base plate 10 and the lens holding frame 22. One end of the spring 30 is supported on a top surface of the hollow cylinder portion 10c of the fixture base plate 10.

When the lens holding frame 22 is located at the non-image-pickup position and the image-pickup standby position, as illustrated in FIGS. 9A, 10, and 11, an overall region of the first driving force generator 24b opposes to the magnet 29a and an overall region of the second driving force generator 24c is located in the neutral zone NZ. Due to the magnetic flux that passes a space between the opposite yoke 28c and the magnet 29a, the first driving force generator 24b generates a thrust parallel to the optical axis direction OA. The lens holding frame 22 is moved by this thrust in the optical axis direction OA.

In the middle of the movement of the lens holding frame 22, as illustrated in FIG. 9B, just before the second driving force generator 24c moves to a position opposite to the magnet 29b, the overall region of the first driving force generator 24b is maintained opposite to the magnet 29a. Therefore, similar to FIG. 9A, the first driving force generator 24b generates a thrust parallel to the optical axis direction OA, and the lens holding frame 22 is moved by this thrust in the optical axis direction OA.

As illustrated in FIG. 9C, when the first driving force generator 24b and the second driving force generator 24c move in the neutral zone NZ, the first driving force generator 24b opposes to the magnet 29a and the second driving force generator 24c opposes to the magnet 29b. At this position, the first driving force generator 24b and the second driving force generator 24c generate thrusts parallel to the optical axis direction OA due to the magnetic fluxes that pass the space between the opposite yokes 28c of the yoke 28 and the magnets 29a and 29b, and the lens holding frame 22 is moved by these thrusts in the optical axis direction OA.

As illustrated in FIG. 9D, when overall region of the second driving force generator 24c opposes to the magnet 29b, the overall region of the first driving force generator 24b is located in the neutral zone NZ. At this position, the second driving force generator 24c generates a thrust parallel to the optical axis direction OA due to the magnetic fluxes that pass the space between the opposite yoke 28c and the magnet 29b, and the lens holding frame 22 is moved by this thrusts in the optical axis direction OA.

As illustrated in FIGS. 9E and 12, when the lens holding frame 22 is located at a maximum feeding position, the overall region of the first driving force generator 24b is located in the neutral zone NZ and the overall region of the second driving force generator 24c is located at a position opposite to the magnet 29b. At this position, similar to FIG. 9D, the second driving force generator 24c of the coil 24 generates a thrust parallel to the optical axis direction OA, and the lens holding frame 22 is moved by this thrust in the optical axis direction OA.

Second Embodiment

Figure 13A:
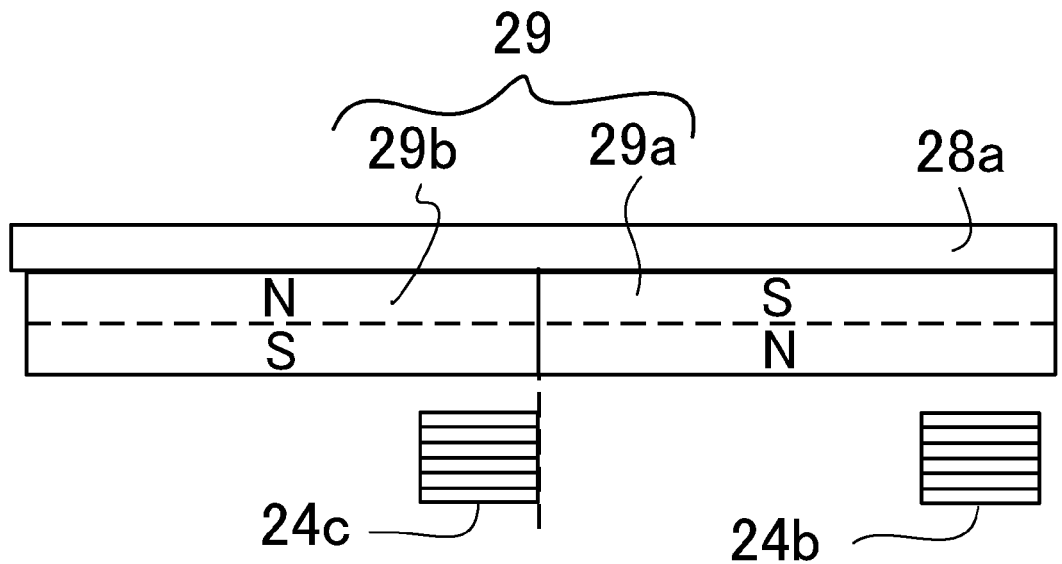
FIGS. 13A and 13B are sectional views illustrating a movement of a coil for a magnet according to a second embodiment.
Figure 13B:
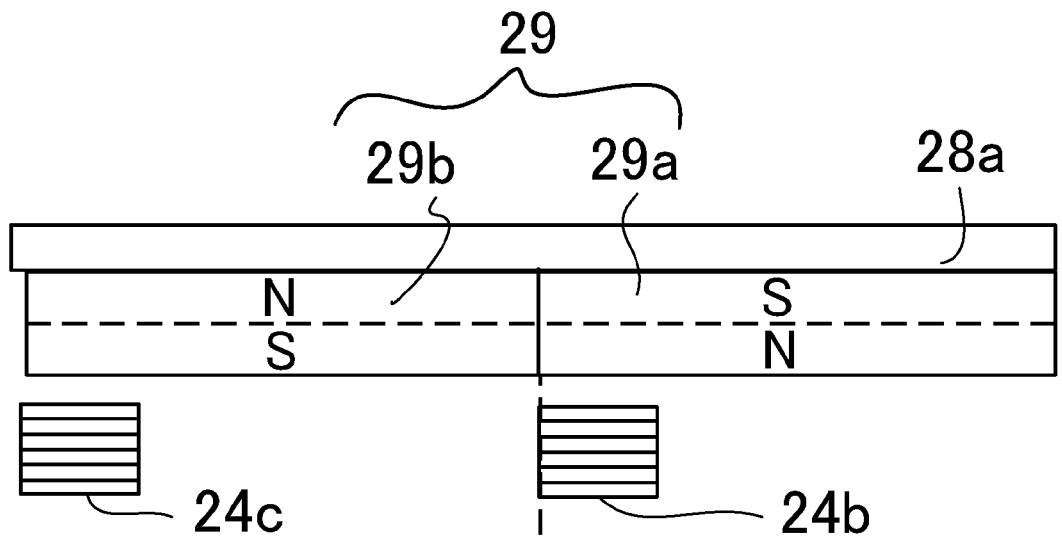

FIGS. 13A and 13B are sectional views illustrating a movement of the coil 24 relative to the magnets 29 according to a second embodiment. In FIG. 13A, illustrates a non-image-pickup state and an image-pickup standby state of the lens holding frame 22. FIG. 13E illustrates a maximum feeding state of the lens holding frame 22. A mechanical structure is similar to that of the first embodiment.

The second embodiment is different from the first embodiment in that in an entire movement range (driving stroke) of the lens holding frame 22, as illustrated in FIGS. 13A and 13E, an overall region of the driving force generator 24b opposes to the magnet 29a and an overall region of the driving force generator 24c opposes to the magnet 29b. This configuration can obtain a similar effect as that of the first embodiment.

In the first and second embodiments, the coil 24 is fixed onto the lens holding frame 22 and the magnets 29 are fixed onto the yoke but the coil 24 may be fixed onto the yoke and the magnet 29 may be fixed onto the lens holding frame 22.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The driving unit is applicable to an application of driving an object.

This application claims the benefit of Japanese Patent Application No. 2009-277314, filed Dec. 7, 2009, which is hereby incorporated by reference herein in its entirety.

What is claimed is:

1. A barrel unit comprising:
a barrel;
a holding member configured to hold an optical element;
a coil fixed onto the holding member and arranged between a yoke and a magnet;
a cylindrical member configured to support the barrel and the holding member; and
a driving unit configured to generate a thrust by electrifying the coil and to drive the holding member in an optical axis direction of the optical element by using the thrust,
wherein the yoke, the magnet, and the coil are located outside of a part of the cylindrical member which supports the barrel,
wherein the cylindrical member has a notch portion,
wherein the holding member includes a body configured to hold the optical element, a sleeve portion configured to hold the coil, and an arm portion configured to connect the sleeve portion to the body and to extend in a direction perpendicular to the optical axis direction, and
wherein the arm portion pass the notch portion of the cylindrical member, and has a length such that the coil can be located outside of the part of the cylindrical member.

2. The barrel unit according to claim 1, wherein the yoke includes a fixture yoke onto which the magnet is fixed, an opposite yoke arranged parallel to the fixture yoke, and a combining portion configured to combine the fixture yoke and the opposite yoke with each other, and
wherein the coil and the magnet are arranged in an internal space formed by the fixture yoke, the opposite yoke, and the combining portion.

3. The barrel unit according to claim 1, wherein the driving unit further includes a guide shaft located outside of the part of the cylindrical member and configured to guide a movement of the holding member.

4. The barrel unit according to claim 3, wherein the holding member includes a sleeve portion, the sleeve portion including an engagement portion engaged with the guide shaft, and a fixture portion inserted into an air core portion of the coil and configured to fix the coil.

5. The barrel unit according to claim 4, wherein a center axis of the guide shaft is orthogonal to a center axis direction of the coil.

6. The barrel unit according to claim 5, wherein the coil is symmetrically arranged with respect to a plane that passes the center axis of the guide shaft and a center axis of the coil.

7. The barrel unit according to claim 6, wherein the coil includes a winding portion in which the current flows in a perpendicular direction to both the optical axis direction and the center axis direction of the coil, and
wherein an axis that is parallel to the optical axis direction and halves a length of the winding portion in the perpendicular direction is located on the plane.

8. An image pickup apparatus comprising a barrel unit,
wherein the barrel unit includes a barrel, a holding member configured to hold an optical element, a coil fixed onto the holding member and arranged between a yoke and a magnet, a cylindrical member configured to support the barrel and the holding member, and a driving unit configured to generate a thrust by electrifying the coil and to drive the holding member in an optical axis direction of the optical element by using the thrust, and wherein the yoke, the magnet, and the coil are located outside of a part of the cylindrical member which supports the barrel,
wherein the cylindrical member has a notch portion,
wherein the holding member includes a body configured to hold the optical element, a sleeve portion configured to hold the coil, and an arm portion configured to connect the sleeve portion to the body and to extend in a direction perpendicular to the optical axis direction, and
wherein the arm portion pass the notch portion of the cylindrical member, and has a length such that the coil can be located outside of the part of the cylindrical member.

* * * * *